United States Patent [19]

Ryan et al.

[11] Patent Number: 4,868,023
[45] Date of Patent: Sep. 19, 1989

[54] POLYOLEFIN ARTICLE HAVING PERMANENT INDICIA THEREON

[75] Inventors: David Ryan, Mountain View; Lawrence D. Schwartz, Menlo Park; Philip Wallis, Laguna Hills; Kenneth M. Winterstein, San Marcos, all of Calif.

[73] Assignee: Raychem Corporation, Menlo Park, Calif.

[21] Appl. No.: 104,716

[22] Filed: Oct. 2, 1987

[51] Int. Cl.$^4$ .......................... B32B 3/00; B41M 7/00
[52] U.S. Cl. .................................. 428/35.1; 101/488; 101/491; 428/195; 428/206; 428/207; 428/208; 428/517; 428/411.1; 428/515; 428/520; 524/441; 524/571
[58] Field of Search .................. 428/36, 195, 206, 207, 428/208, 517, 141, 35.1, 411.1, 515, 520; 101/426; 106/20, 22, 23; 524/571, 441

[56] References Cited

U.S. PATENT DOCUMENTS

| | | | |
|---|---|---|---|
| 3,894,741 | 7/1975 | Evans | 269/47 |
| 3,985,852 | 10/1976 | Evans | 264/132 |
| 4,032,010 | 6/1977 | Evans | 206/345 |
| 4,206,909 | 6/1980 | Wintle | 269/47 |
| 4,233,145 | 11/1980 | Mills | 524/441 |
| 4,248,636 | 2/1981 | Sasaki et al. | 524/473 |
| 4,337,183 | 6/1982 | Santiago | 524/446 |
| 4,349,404 | 9/1982 | Changani et al. | 156/308.4 |
| 4,425,390 | 1/1984 | Changani et al. | 428/43 |
| 4,465,717 | 8/1984 | Crofts et al. | 428/40 |
| 4,488,642 | 12/1984 | Changani et al. | 206/345 |
| 4,584,238 | 4/1986 | Gen et al. | 428/349 |
| 4,648,405 | 3/1987 | Peck et al. | 524/156 |
| 4,661,305 | 4/1987 | Carlomango | 264/132 |

Primary Examiner—Ellis P. Robinson
Assistant Examiner—James J. Seidleck
Attorney, Agent, or Firm—Edith A. Rice; Herbert G. Burkard

[57] ABSTRACT

An article having a surface comprising an olefin polymer is marked with indicia using an ink comprising a binder capable of substantially complete cure at a temperature of about 100° to 300° C. for less than about 10 minutes and then heated to cure the binder. The indicia are permanent, e.g. are resistant to being rubbed off and are solvent resistant. Heat-recoverable marker sleeves having such permanent indicia are particularly useful for marking wires, e.g. in aircraft harnessing.

15 Claims, 2 Drawing Sheets

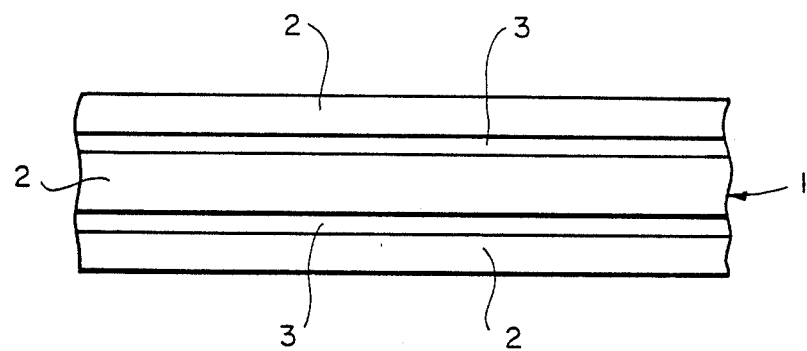
FIG_1A
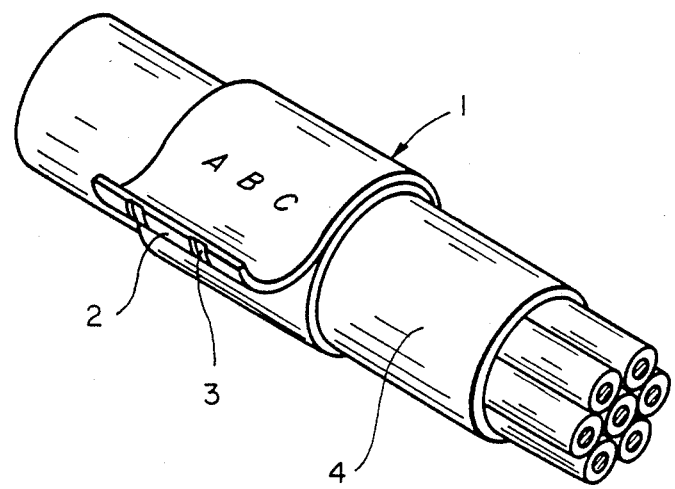
FIG_1B

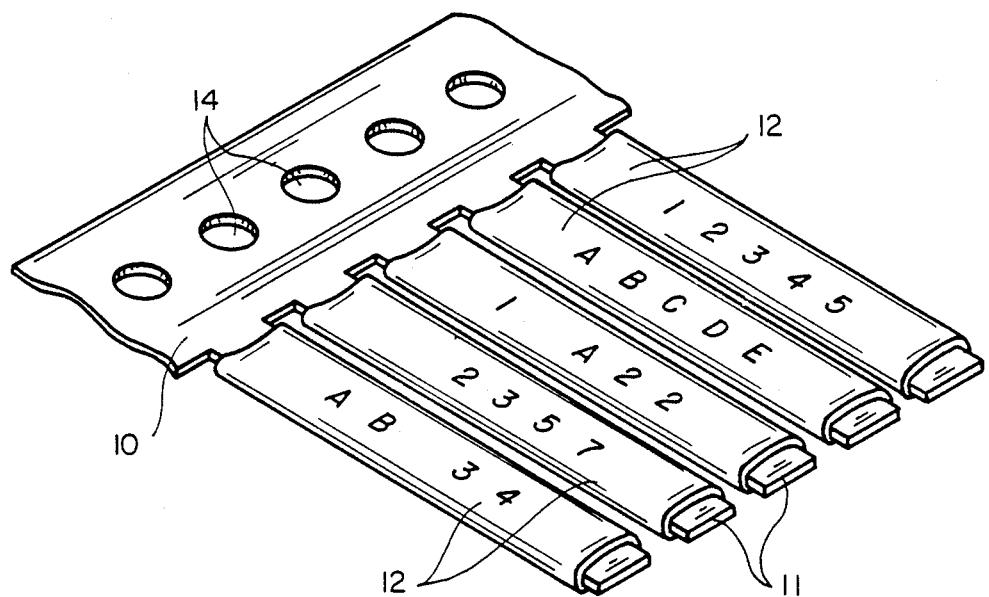
FIG_2

… (c) heating the article to cure said binder, thereby rendering said indicia permanent.

POLYOLEFIN ARTICLE HAVING PERMANENT INDICIA THEREON

This invention relates to an article with a surface comprising an olefin polymer having permanent indicia thereon and to a method of producing permanent indicia on a polyolefin surface.

Substrates such as wires, cables, equipment housing and the like are sometimes labeled with marker assemblies comprising a polymeric article marked with indicia, such as letters or numbers or combinations thereof. To identify individual wires of a harness the marker assembly may comprise a sleeve, preferably heat recoverable, of a polymeric material such as a polyolefin. Such sleeves are provided in a variety of colors, including black, for color coding the wires. Relatively flat polymeric articles may be used for similarly marking large diameter cables and electrical equipment. The indicia are generally typed onto the article using typewriting or similar printing equipment. Generally the ink used is black. For many uses, the indicia need to be permanent (i.e. durable), e.g. resistant to being rubbed off and resistant to solvents which may contact the wire, as discussed more fully below. This latter requirement is generally specified for aircraft wiring, which may come into contact with hydraulic fluid, liquid fuel, de-icing solvents or the like. Black ink is generally rendered permanent by a heat treatment. This heat treatment, referred to as permatization, may take place by placing the sleeve in an oven or subjecting it to infrared radiation or in the case of heat recoverable sleeves, by the heat applied during the heat-recovery step. Obtaining a visible permanent mark on black articles has necessitated use of a relatively expensive "hot-stamping" technique. Use of conventional white ink formulations have not produced a mark of the desired permanence.

We have now discovered that permanent indicia can be obtained on a polyolefin article by use of the appropriate ink, as defined hereinafter. The permanent indicia may be white for the desired contrast on black or other dark colored surfaces or any other desired color for use on a contrasting color substrate.

SUMMARY OF THE INVENTION

One aspect of this invention comprises an article for application to a substrate comprising:
 (a) an article having a surface comprising an olefin polymer and
 (b) permanent indicia on said surface of said article formed of an ink comprising:
  (i) a binder capable of adhering to said surface and capable of substantially complete cure when heated to about 100° C. to about 300° C. in less than about 10 minutes; and
  (ii) a pigment.

Another aspect of this invention comprises a method of forming a durable mark on a polymer article which comprises:
 (a) selecting an article having a surface comprising an olefin polymer;
 (b) forming indicia on the surface thereof with an ink comprising:
  (i) a binder capable of adhering to said surface and capable of substantially complete cure when heated to about 100° to about 300° C. in less than about 10 minutes; and
  (ii) a pigment; and
 (c) heating the article to cure said binder, thereby rendering said indicia permanent.

BRIEF DESCRIPTION OF THE DRAWING

FIG. 1a illustrates an article of this invention suitable for use as a cable marker.

FIG. 1b illustrates use of the article wrapped around an electric cable.

FIG. 2 is a perspective view of partially recovered heat recoverable tubular articles of this invention having permanent indicia thereon and mounted on a bandolier.

DETAILED DESCRIPTION OF THE INVENTION

The article marked in according with this invention has a surface comprising an olefin polymer. Preferably the entire article is made from a composition comprising an olefin polymer, but a composite article in which a surface layer only comprises an olefin polymer may be employed.

The terms "olefin polymer" and "polyolefin" are used herein to refer to homo and copolymers of olefins, for example, polyethylene, e.g. lower high density polyethylene or linear low density polyethylene, ethylene/ethyl acrylate copolymers, ethylene/vinyl acetate copolymers, ethylene/methyl acrylate copolymers, and the like. Blends containing one or more of these polymers together with other polymers, e.g. ethylene/propylene/diene terpolymers, can also be used.

The olefin polymer composition from which the sleeve is prepared may contain various additives, for example, flame retardants such as decabromodiphenyl ether, perchloropentacyclodecane, silicone resins, 1,2-bis (tetrabromophthalimido) ethylene, etc.; antioxidants such as alkylated phenols, e.g. those commercially available as Goodrite 3125, Irganox 1010, Irganox 1035, Irganox 1076, Irganox 1093, Vulkanox BKF, organic phosphite or phosphates, e.g. dilauryl phosphite, Mark 1178, alkylidene polyphenols, e.g. Ethanox 330, thio-bis alkylated phenol, e.g. Santonox R, dilauryl thio-dipropionate, e.g. Carstob DLTDP, dimyristyl thiodipropionate, e.g. Carstab DMTDP, distearyl thiodipropionate, e.g. Cyanox STDP, amines, e.g. Wingstay 29, etc.; inorganic fillers, such as clay, silica, etc.; pigments such as carbon black, titanium dioxide, zinc oxide, iron oxide, etc., processing aids, and the like. Certain additives may improve durability or permanence of the mark while others may be detrimental, depending on the particular binder of the ink and olefin polymer of the surface. As mentioned above, the invention is particularly suitable for printing on black surfaces, which contain for example carbon black as a pigment. It is, however, possible to utilize this invention to print on surfaces of any color.

The ink utilized in accordance with this invention comprises a binder, a pigment and optionally a diluent. The binder comprises a non-volatile polymerizable monomeric or an oligomeric or a polymeric material. The binder should be capable of substantially complete cure, e.g. polymerization and/or crosslinking when heated to a temperature in the range of about 100° to about 300° C. preferably about 200° to about 300° C. in less than about 10 minutes preferably less than about 3 minutes.

Preferred binders include for example polybutadiene, polyaziridine, polyacrylate or the like.

The ink may contain a diluent, for example semi-drying or non-drying oils such as mineral oil, castor oil, cottonseed oil, sesame oil, oleic acid, ricinoleic acid, and the like, fatty esters derived therefrom, such as methyl vicinoleate, etc. The diluent can be present in an amount of about 0 to about 50% by weight based on the weight of the ink formulation, preferably about 10 to about 30 and most preferably about 15 to about 20% by weight.

The ink also contains any pigment or mixtures of pigments to obtain an ink of the desired color. Such pigments include for example titanium dioxide, cadmium sulfide, carbon black, zinc oxide, CI Pigment Yellow 36, CI Pigment Yellow 37, CI Pigment Yellow 55, CI Pigment Red 48, CI Pigment 49, CI Pigment Blue 1, CI Pigment Blue 2, CI Pigment Blue 15, CI Pigment Blue 19, CI Pigment Violet 3, metal particles such as aluminum, silver, bronze, gold, or the like. It is to be understood that the pigment selected depends to a certain extent on the color of the marker sleeve and should be selected to provide adequate contrast and hiding power. For example, the use of white ink on a white substrate is generally unsuitable.

A curing agent, such as benzoyl peroxide and the like may be incorporated in the ink formulation. This provides more rapid curing and/or curing at lower temperatures, if desired. Other additives such as antioxidants, UV stabilizers and the like may also be included.

The ink should have a viscosity of about 500 to about 5000 centipoise, preferably of about 800 to about 3000 centipoise.

In accordance with this invention, the ink formulation is applied to an article having an olefin polymer surface. Two typical articles are illustrated in FIGS. 1a, 1b and 2. In FIG. 1a, a polyolefin strip 1 is provided with hot melt adhesive 2 and pressure sensitive adhesive 3 on the surface thereof. The ink is applied on the opposite surface of the strip so that, as shown in FIG. 1b, when it is wrapped around cable 4, the indicia formed of the ink are visible and the adhesive secures the article to the cable. Such an article and its use is described in more detail in U.S. Pat. No. 4,465,717 to Crafts et al., the entire disclosure of which is incorporated by reference.

In FIG. 2, heat recoverable sleeves 12 have been partially heat recovered into projections 11 which extend from carrier 10. The carrier 10 is provided with perforations 14 for facilitating feeding the sleeves through a printer. Such an assembly is more fully described in U.S. Pat. No. 3,894,731 to Evans, the entire disclosure of which is incorporated by reference. Other assemblies of heat recoverable marker sleeves suitable for use in this invention are described in U.S. Pat. No. 4,349,404 to Changani et al., and U.S. patent application Ser. No. 63,192 filed June 17, 1987.

Heat-recoverable articles are articles, the dimensional configuration of which may be made substantially to change when subjected to heat treatment. Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline point or, for amorphous materials the softening point, as the case may be, of the polymer, deforming the article and cooling the article whilst in the deformed state so that the deformed state of the article is heat-unstable, application of heat will cause the article to assume its original heat-stable shape.

The crosslinking can be effected by chemical means, e.g. with peroxides, or by irradiation or a combination of the two. Radiation employed can be of various types including charged particles e.g. alpha particles or high energy electrons and electromagnetic radiation e.g. gamma or ultraviolet radiation.

Radiation doses of any desired amount can be used although, generally a dosage of from 1 to 50, preferably 2 to 20 Mrads will be sufficient.

The ink formulation is applied to the article to be marked in any appropriate manner. The olefin polymer surface of the article may be pretreated to improve the adherence of the ink, e.g. by flame or plasma treatment. The printer is preferably an impact printer e.g. a thermal printer, dot-matrix printer, daisy wheel printer or golfball printer, and may be attached to any appropriate computer or word-processor. The ink is conveniently in the form of a ribbon, e.g. coated onto a fabric ribbon backing and supplied as a cartridge to be inserted in an impact printer. The fabric backing is preferably of silk, cotton, nylon, polyester, or the like.

The mark may be permatized by heating the sleeve to obtain substantially complete cure of the ink. This step may be achieved by placing the sleeve in an oven. If the article is heat recoverable, it should be restrained from complete recovery during permatization. Alternatively the steps of heat recovering the sleeve and permatizing the mark can be simultaneously. In this case, care should be employed in positioning the sleeve over the substrate to avoid smearing the unpermatizied mark. Applying a coating, for example as a spray, of an acrylic resin may further inhibit smearing of the unpermatized mark.

After permatization, the mark is durable or permanent, i.e. resistant to abrasion and organic solvents. The degree of permanence varies depending on the particular application. For use in wire and harnessing for military use, resistance to organic solvents and abrasion is of paramount importance. In this regard, it is necessary for the marked article to meet the requirements of Military Specification MIL-M-81531 and Military Standard MIL-STD-202, both of which are incorporated by reference herein. With respect to abrasion, Military Specification MIL-M-81531 requires that the markings or indicia be readable after being rubbed with an eraser 20 times.

With respect to resistance to organic solvents, Military Standard MIL-STD-202 requires that the marks or indicia be readable after being immersed in a variety of organic solvents and then brushed with a toothbrush.

These organic solvents include: mixtures of isopropyl alcohol and mineral spirits; an azeotrope mixture of trichlorotrifluoroethane (FREON ® TF, a registered trademark of E. I. DuPont de Nemours) and methylene chloride; 1,1,1—trichloroethane; and an aqueous solution of butyl cellusolve and monoethanolamine.

In addition to meeting the requirements of Military Standard MIL-STD-202, it is preferred that the markings or indicia be resistant to removal during prolonged immersion in the following organic solvents: JP-4 fuel (kerosene), Skydrol ™ (a phosphate ester hydraulic fluid available from Monsanto Company), hydraulic fluid (petroleum based), aviation gasoline, lubricating oil (ester based) and anti-icing fluid (an aqueous mixture of glycols). These organic solvents are further specified in the Raychem Corporation Specification RT-1800/2, which is incorporated by reference herein.

It is also preferred that the marked article according to the invention is resistant to dichloromethane which is representative of the class of halogenated solvents which include 1,1,1—trichloroethane and FREON mixtures.

It is, of course, anticipated that the marked article according to the invention will be resistant to many other organic solvents as well as many inorganic solvents.

It should be understood, then, that whenever throughout this specification the markings or indicia are stated to be permanent or durable they are resistant to organic solvents, smearing and abrasion, such resistance to organic solvents, smearing and abrasion shall be defined as indicated above.

EXAMPLE 1

An ink formulation was prepared by mixing in an agitated bead mill, 50 grams liquid polybutadiene (Ricon 156 commercially available from Colorado Chemical Specialty Inc., of Golden, Colo.), 17 grams dioctyl phthalate, 26 grams titanium dioxide and 70 grams aluminum paste. The ink was applied to a fabric ribbon suitable for use in a typewriter and indicia were typed onto partially recovered marker sleeves supported on a bandolier as shown in FIG. 2 and described above. The marker sleeves were made from a composition containing polyethylene, flame retardants, antioxidants and carbon black pigment. The marker sleeve was then heated in an infra-red oven.

The permanence of the indicia formed by the ink was tested using MIL 81531 and MIL-STD-202. All samples passed the test for each solvent.

What is claimed is:

1. A heat recoverable marker sleeve comprising:
   (a) a heat recoverable article having a surface comprising an olefin polymer and
   (b) permanent indicia on said surface of said article formed of a substantially completed cured ink composition comprising:
      (i) a binder capable of adhering to said surface and capable of substantially complete cure when heated to about 100° to about 300° C. in less than about 10 minutes; and
      (ii) a pigment.

2. An article in accordance with claim 1, wherein said article comprises a tubular article comprising polyethylene.

3. An article in accordance with claim 1, wherein said binder is selected form the group consisting of polybutadiene, polyaziridine, and a polyacrylate.

4. An article in accordance with claim 3, wherein said binder is polybutadiene.

5. An article in accordance with claim 1, wherein the ink further comprises a diluent.

6. An article in accordance with claim 5, wherein the diluent is dioctyl phthalate.

7. An article in accordance with claim 1, wherein said pigment is selected form the group consisting of titanium dioxide, cadmium sulfide, carbon black, zinc oxide, CI Pigment Yellow 36, CI Pigment Yellow 37, CI Pigment Yellow 55, CI Pigment Red 48, CI Pigment 49, CI Pigment Blue 1, CI Pigment Blue 2, CI Pigment Blue 15, CI Pigment Blue 19, CI Pigment Violet 3, and metal particles.

8. An article in accordance with claim 1, wherein surface is other than white.

9. An article in accordance with claim 8, wherein the pigment is titanium dioxide.

10. An article in accordance with claim 8, wherein the pigment is a mixture of titanium dioxide and aluminum paste.

11. An article in accordance with claim 8, wherein said surface is black and said ink contains a pigment mixture comprising titanium dioxide and aluminum paste.

12. A method of forming permanent indicia on a heat recoverable marker sleeve which comprises:
   (a) selecting a heat recoverable article having a surface comprising an olefin polymer;
   (b) forming indicia on the surface thereof with an ink comprising:
      (i) a binder capable of adhering to said surface and capable of substantially complete cure when heated to about 100° to about 300° C. in less than about 10 minutes; and
      (ii) a pigment; and
   (c) heating the article to substantially completely cure said binder, thereby rendering said indicia permanent.

13. A method in accordance with claim 12, wherein said article comprises a heat recoverable tubular article and said article is at least partially prevented from recovery during step (c).

14. A method in accordance with claim 12, which further comprises the additional step of causing said article to recover by applying heat thereto.

15. A method in accordance with claim 12, wherein the indicia are formed on the surface by means of an impact printer and the ink is in the form of a fabric ribbon backing impregnated with the ink.

* * * * *